United States Patent
Strassberger

(10) Patent No.: US 10,395,524 B2
(45) Date of Patent: Aug. 27, 2019

(54) METHOD AND SYSTEM FOR DETECTING AUTONOMOUSLY DRIVEN VEHICLES, FOR DISTANCE MEASUREMENT AND FOR DISTANCE CONTROL

(71) Applicant: Bayerische Motoren Werke Aktiengesellschaft, Munich (DE)

(72) Inventor: Markus Strassberger, Wartenberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 23 days.

(21) Appl. No.: 15/230,533

(22) Filed: Aug. 8, 2016

(65) Prior Publication Data
US 2016/0343247 A1 Nov. 24, 2016

Related U.S. Application Data

(63) Continuation of application No. PCT/EP2015/052139, filed on Feb. 3, 2015.

(30) Foreign Application Priority Data

Feb. 11, 2014 (DE) ........................ 10 2014 202 453

(51) Int. Cl.
*B60W 30/16* (2012.01)
*G08G 1/16* (2006.01)
(Continued)

(52) U.S. Cl.
CPC ............ *G08G 1/015* (2013.01); *B60W 30/16* (2013.01); *B60W 40/04* (2013.01); *G01S 13/865* (2013.01); *G01S 13/867* (2013.01); *G01S 13/91* (2013.01); *G01S 13/931* (2013.01); *G08G 1/017* (2013.01); *G08G 1/0175* (2013.01); *G08G 1/162* (2013.01); (Continued)

(58) Field of Classification Search
CPC .... B60W 30/16; B60W 30/165; G08G 1/015; G08G 1/017
See application file for complete search history.

(56) References Cited

U.S. PATENT DOCUMENTS 6,789,637 B1    9/2004  Winner et al.
9,111,453 B1 *  8/2015  Alselimi ............ G06K 9/00785
(Continued)

FOREIGN PATENT DOCUMENTS

DE    10 2009 052 590 A1    5/2011
DE    10 2019 028 637 A1    11/2011
(Continued)

OTHER PUBLICATIONS

International Search Report (PCT/ISA/210) issued in PCT Application No. PCT/EP2015/052139 dated Jun. 5, 2015 with English translation (eight pages).
(Continued)

*Primary Examiner* — Anshul Sood
(74) *Attorney, Agent, or Firm* — Crowell & Moring LLP

(57) ABSTRACT

A method is provided for detecting autonomously driven vehicles, in which a motion trajectory of a first vehicle is determined. According to the determined motion trajectory, an autonomy characteristic, which is representative of whether the first vehicle can be driven autonomously or not, is determined.

20 Claims, 4 Drawing Sheets

(51) Int. Cl.
   *G08G 1/015* (2006.01)
   *B60W 40/04* (2006.01)
   *G01S 13/91* (2006.01)
   *G01S 13/93* (2006.01)
   *G01S 13/86* (2006.01)
   *G08G 1/017* (2006.01)
   *B60W 50/12* (2012.01)
   *B60K 28/06* (2006.01)
   *B60W 50/029* (2012.01)

(52) U.S. Cl.
   CPC ............. *G08G 1/163* (2013.01); *G08G 1/164* (2013.01); *B60K 28/06* (2013.01); *B60W 50/12* (2013.01); *B60W 2050/0292* (2013.01); *B60W 2550/306* (2013.01); *B60W 2750/308* (2013.01); *G01S 2013/935* (2013.01); *G01S 2013/936* (2013.01); *G01S 2013/9321* (2013.01); *G01S 2013/9325* (2013.01); *G01S 2013/9342* (2013.01); *G01S 2013/9346* (2013.01); *G01S 2013/9353* (2013.01)

(56) References Cited

U.S. PATENT DOCUMENTS

| | | | |
|---|---|---|---|
| 9,707,942 B2 * | 7/2017 | Cheatham, III | B60T 7/12 |
| 2002/0007239 A1 * | 1/2002 | Matsumoto | B60K 23/0808 |
| | | | 701/41 |
| 2010/0228533 A1 | 9/2010 | Cummings et al. | |
| 2012/0191318 A1 | 7/2012 | Holzmann et al. | |
| 2013/0024075 A1 | 1/2013 | Zagorski et al. | |
| 2013/0268184 A1 | 10/2013 | Zagorski et al. | |
| 2013/0307981 A1 | 11/2013 | Jang et al. | |
| 2016/0121892 A1 | 5/2016 | Zinner et al. | |

FOREIGN PATENT DOCUMENTS

| | | |
|---|---|---|
| DE | 10 2012 210 679 A1 | 1/2013 |
| DE | 10 2011 080 922 A1 | 2/2013 |
| DE | 10 2013 205 933 A1 | 10/2013 |
| DE | 10 2014 202 453 A1 | 8/2015 |
| EP | 1 569 183 A2 | 8/2006 |
| EP | 2 481 650 A1 | 8/2012 |
| WO | WO 01/20362 A1 | 3/2001 |
| WO | WO 2009/027244 A1 | 3/2009 |
| WO | WO 2009/068128 A1 | 6/2009 |
| WO | WO 2014/202365 A1 | 12/2014 |

OTHER PUBLICATIONS

German-language Written Opinion (PCT/ISA/237) issued in PCT Application No. PCT/EP2015/052139 dated Jun. 5, 2015 (seven pages).

German Search Report issued in counterpart German Application No. 10 2014 202 453.0 dated Sep. 11, 2014 with partial English translation (10 pages).

* cited by examiner

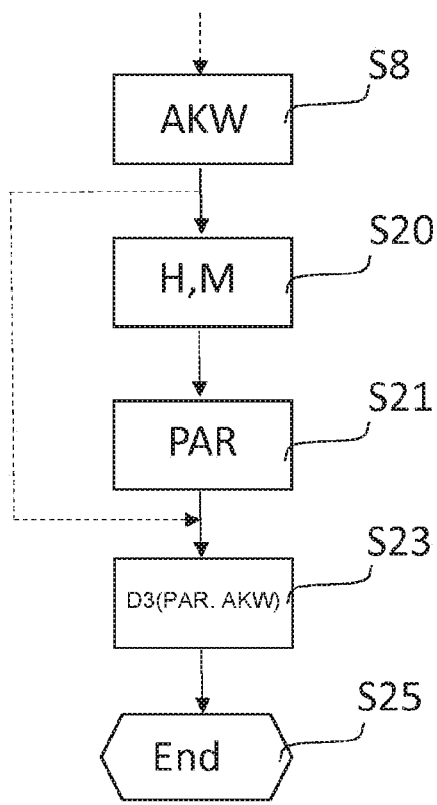

METHOD AND SYSTEM FOR DETECTING AUTONOMOUSLY DRIVEN VEHICLES, FOR DISTANCE MEASUREMENT AND FOR DISTANCE CONTROL

CROSS REFERENCE TO RELATED APPLICATIONS

This application is a continuation of PCT International Application No. PCT/EP2015/052139, filed Feb. 3, 2015, which claims priority under 35 U.S.C. § 119 from German Patent Application No. 10 2014 202 453.6, filed Feb. 11, 2014, the entire disclosures of which are herein expressly incorporated by reference.

BACKGROUND AND SUMMARY OF THE INVENTION

The invention relates to a method for detecting autonomously operated vehicles. Furthermore, the invention relates to a device for detecting autonomously operated vehicles. Furthermore, the invention relates to a method for distance measurement. Furthermore, the invention relates to a system for distance measurement. Furthermore, the invention relates to a method for distance control. Furthermore, the invention relates to a system for distance control. Furthermore, the invention relates to a computer program and to a computer program product.

In the future, vehicles will be operated autonomously more and more frequently. In this context, autonomously means, in particular, that a vehicle navigates free of human assistance, in particular free of human assistance by a vehicle driver. The more frequently a vehicle driver has to intervene in the control of the vehicle, the less autonomously the respective vehicle is operated.

WO 2009/068128 A1 discloses a method for distance regulation for a vehicle and a distance regulating system in which a first vehicle intermediate distance is determined as a distance between the vehicle and a first third-party vehicle travelling ahead of the vehicle, and is regulated to a pre-defineable setpoint distance.

WO 01/20362 A1 discloses a device which determines, as a function of velocity, a setpoint distance or a setpoint time gap relating to a vehicle travelling ahead. During the determination of the setpoint distance or the setpoint time gap, a distance regulation system takes into account a minimum distance which can be predefined by the driver or a pre-defineable minimum time gap.

WO 09027244 A1 discloses a method and a device for detecting the traffic situation in the surroundings of a vehicle, in which method and device vehicle movement dynamics data of the vehicle in question are determined by way of a sensor system in the vehicle in question and a vehicle-to-vehicle communication is set up with other vehicles which are to be involved in the determination.

EP 1 569 183 A2 discloses a system for performing open-loop and/or closed-loop control of at least one, preferably autonomous, driver assistance system, in particular a plurality thereof, each assigned to at least one means of locomotion, in particular each assigned to at least one motor vehicle. The driver assistance systems can be subjected to an open-loop and/or closed-loop control by way of data and/or instructions which can be exchanged between the driver assistance systems and at least one central station, in particular at least one central computer, via at least one, in particular, wireless communication network.

The object on which the invention is based is to detect autonomously operated vehicles from the outside.

This and objects are achieved by a method for detecting autonomously operated vehicles, in which a motion trajectory of a first vehicle is determined, and an autonomy characteristic value which is representative of whether the first vehicle has been detected as being operated autonomously or non-autonomously, is determined as a function of the determined motion trajectory.

According to a first aspect, the invention is distinguished by a method for distance measurement. The invention is furthermore characterized by a system which corresponds to the method for distance measurement.

A motion trajectory of a first vehicle is determined. An autonomy characteristic value, which is representative of whether the first vehicle has been detected as being operated autonomously or non-autonomously, is determined as a function of the determined motion trajectory.

As a result, non-autonomous vehicles can be differentiated from autonomously operated vehicles, in particular without communication having to take place with the first vehicle. It is therefore easily possible to detect from outside the first vehicle whether the first vehicle is being operated autonomously or non-autonomously. The motion trajectory is, in particular, representative of a movement path of the first vehicle here.

According to one advantageous configuration, a first distance profile for a second vehicle which is driving in front of the first vehicle is determined as a function of the determined motion trajectory. The autonomy characteristic value is determined as a function of the first distance profile.

By means of the actual first distance profile for the second vehicle which is driving in front of the first vehicle it is, under certain circumstances, easily and reliably possible to determine whether the first vehicle is driving autonomously or not, since particularly during the distance regulation it can be easily detected whether the driver of the vehicle, who is a human, is navigating the first vehicle.

According to one advantageous configuration, a lane-keeping profile of the first vehicle is determined as a function of the determined motion trajectory. The autonomy characteristic value is determined as a function of the lane-keeping profile.

Particularly in the case of lane keeping, under certain circumstances the driver of a vehicle reacts differently than an autonomously operated vehicle. Therefore, it can easily be detected on the basis of the lane-keeping profile whether the driver of the vehicle steers the first vehicle, therefore also whether the first vehicle is operated autonomously or non-autonomously. In particular if the autonomy characteristic value is determined as a function of the first distance profile and as a function of the lane-keeping profile, the autonomy characteristic value can be determined very reliably.

According to a further advantageous configuration, a second distance profile of the first vehicle with respect to a sensor unit is determined as a function of the determined motion trajectory. The sensor unit is arranged outside the first vehicle and is designed to generate a measurement signal, wherein the motion trajectory is determined as a function of the measurement signal. The autonomy characteristic value is determined as a function of the second distance profile. The sensor unit is arranged, in particular, in a stationary fashion outside the first vehicle.

In particular, by way of the second distance profile it is possible, under certain circumstances, to detect very simply whether the driver of the vehicle is navigating the first vehicle.

According to a further advantageous configuration, the autonomy characteristic value is determined as a function of a detection of atypical values in the motion trajectory.

In particular, if more than one predefined maximum number of atypical values is detected and/or if an atypical value is higher than a predefined maximum atypical value, under certain circumstances it can be inferred that the driver of the vehicle is navigating the vehicle and that the vehicle is therefore being operated non-autonomously. The atypical values are optionally detected directly in the first distance profile and/or the lane-keeping profile and/or the second distance profile.

According to a further advantageous configuration, the autonomy characteristic value is determined as a function of a frequency analysis of the motion trajectory.

In particular, if the motion trajectory is more angular, that is to say has a very large number of frequency components, it can therefore be inferred, for example, that, under certain circumstances, the driver of the vehicle is navigating the vehicle. Optionally, a frequency analysis of the first distance profile and/or of the lane-keeping profile and/or of the second distance-keeping profile is carried out directly.

According to a further advantageous configuration, subsequent to reception of an autonomy information item from outside the first vehicle, which autonomy information item is representative of whether the first vehicle is being operated autonomously or non-autonomously, the autonomy characteristic value is determined as a function of the autonomy information item.

As a result, the autonomy characteristic value can be very reliably validated or protected with the result that even more reliable determination of the autonomy characteristic value is possible. The autonomy information is transmitted, for example, by the first vehicle and/or by a backend, wherein the backend is designed to receive, transmit and process data, in particular data which relates to the autonomy information of the first vehicle.

According to a second aspect, the invention is distinguished by a method for distance measurement. The invention is furthermore distinguished by a system which corresponds to the method for distance measurement. The method for detecting autonomously operated vehicles is carried out according to the first aspect or an advantageous configuration of the first aspect. A distance of the first vehicle from the second vehicle which is driving in front of the first vehicle is determined. A distance threshold value is determined as a function of the autonomy characteristic value, specifically in such a way that if the first vehicle has been detected as being operated autonomously, the distance threshold value is lower than if the first vehicle has been detected as being operated non-autonomously. It is determined whether the determined distance is less than the determined distance threshold value. If the determined distance is less than the determined distance threshold value, an information item in this respect is stored.

The determination of the distance threshold value and the determination of the distance are carried out, in particular, outside the first vehicle, for example in a stationary unit and/or in the backend.

The information item which is stored in this respect includes, for example, the determined distance and/or a difference between the determined distance and the determined distance threshold value and/or whether the first vehicle has been detected as being operated autonomously or non-autonomously. The information item alternatively or additionally includes, for example, a recorded image of the driver of the vehicle and/or the speed of the first vehicle and/or a detected license plate of the first vehicle.

By use of the stored information it is possible to signal, for example, to the police or the like that the first vehicle is at the determined distance which is less than the determined distance threshold value which corresponds, for example, to a legal maximum distance. Furthermore, it is possible, for example if the vehicle has been detected as being autonomous, to inform the manufacturer of the first vehicle about the incident by way of the stored information.

According to a further advantageous configuration, an autonomy message which includes the autonomy information is transmitted on the vehicle side from the first vehicle.

According to one advantageous configuration, the autonomy message is transmitted periodically on the vehicle side by the first vehicle.

The autonomy message can therefore be transmitted, in particular, within the scope of a standardized, periodically emitted message such as, for example, what is referred to as a Cooperative Awareness Message (CAM), for example according to the standard "ETSI TS 102 637-3 V1.2.1 (2011-03), Intelligent Transport Systems (ITS); Vehicular Communications; Basic Set of Applications; Part 2: Specification of Cooperative Awareness Basic Service" and/or what is referred to as a Basic Safety Message (BSM), for example according to the standard "SAE J2735, Dedicated Short Range Communications (DSRC) Message Set Dictionary".

According to a further advantageous configuration, the autonomy message is transmitted on the vehicle side by the first vehicle in response to a request which has been transmitted to the first vehicle from outside the first vehicle.

As a result, the transmission of the autonomy message can be implemented without adapting standards.

According to a further advantageous configuration, the request is signed outside the first vehicle by means of a certificate. As a result, in particular the security of the communication can be increased from outside the first vehicle.

According to a further advantageous configuration, the autonomy message is signed on the vehicle side by the first vehicle by means of a certificate. As a result, in particular the security of the communication can be increased on the vehicle side.

According to a further advantageous configuration, the autonomy message is verified outside the first vehicle by way of a challenge-response method. As a result, in particular the security of the communication can be increased from outside the first vehicle. The challenge-response method is distinguished, in particular, by the fact that a task is transmitted to the first vehicle from outside the first vehicle, which task has to be performed in order to prove that the predefined information item is known in the first vehicle, without transmitting this information itself.

According to a further advantageous configuration, the autonomy message includes the autonomy information in encrypted form, and the encrypted autonomy information is decrypted outside the first vehicle.

As a result, in particular the private sphere of the driver of the first vehicle can be protected.

According to a further advantageous configuration, a plausibility signal of the autonomy information is determined as a function of at least one bus signal in the first vehicle. If the determined plausibility is representative of a probable manipulation of the autonomy information item, a plausibility signal is transmitted on the vehicle side from the first vehicle. In response to the plausibility signal, the autonomy characteristic value is determined outside the first vehicle as a function of the plausibility signal.

As a result, the reliability of the determined autonomy characteristic value can be increased, since the plausibility signal can, under certain circumstances, be undetected only with great difficulty.

According to a third aspect, the invention is distinguished by a method for distance control in a third vehicle which is driving behind the first vehicle. The invention is furthermore distinguished by a system for distance control which corresponds to the method for distance control. The method for detecting autonomously operated vehicles is carried out according to the first aspect or according to an advantageous configuration of the first aspect. A distance from the third vehicle to the first vehicle is set as a function of the autonomy characteristic value.

As a result, in a vehicle which is driving behind the first vehicle it is possible to set the distance depending on whether the first vehicle is being operated autonomously or non-autonomously, with the result that, for example if the first vehicle has been detected as being operated autonomously, a shorter distance can be set than if the first vehicle has been detected as being operated non-autonomously.

According to one advantageous configuration, a manufacturer and/or a model designation of the first vehicle are/is determined. At least one parameter for a distance control is determined as a function of the determined manufacturer and/or the determined model designation. The distance from the third vehicle to the first vehicle is set as a function of the at least one determined parameter.

The parameter is stored here, in particular, in a database. As a result, it is possible, for example, to adopt various regulation settings of autonomously operated vehicles of various manufacturers, with the result that the travel of the third vehicle is adapted to the first vehicle.

According to a further advantageous configuration, a parameter for distance control is determined as a function of the determined motion trajectory, and the distance from the third vehicle to the first vehicle is set as a function of the at least one determined parameter.

As a result, the distance can be adapted even for vehicles whose manufacturer and/or whose model designation could not be determined and/or for which there is no parameter present. In this context, it is, in particular, additionally possible to determine, by way of crowd sourcing and/or by the backend, a driver profile for determining the at least one parameter.

According to a further advantageous configuration, in the case of a predefined emergency situation, the distance from the third vehicle to the first vehicle is set in response to detection of the predefined emergency situation.

For this purpose, for example, information relating to the predefineable emergency situation is transmitted by the first vehicle. The information relates, for example, to brief, fully autonomous operation of the first vehicle, with the objective of a safe stationary state of the first vehicle in the predefined emergency situation. The emergency situation includes, for example, a critical driver state if it has been detected that the respective driver of the vehicle is no longer able to control the first vehicle safely, for example owing to a heart attack. The emergency situation alternatively or additionally includes, for example, the situation in which the first vehicle is in an autonomous or partially autonomous mode and this mode can no longer be maintained, for example owing to a faulty vehicle state and a driver of the vehicle who cannot assume control, or for example cannot do so within the necessary time.

Since in the case of an emergency situation of this type an autonomous regulating system of the respective vehicle does not, under certain circumstances, react as in a normal operating mode, as a result the distance can be set particularly reliably.

The detection of the emergency situation is carried out, for example, by way of wireless communication with the first vehicle, during which communication, a message is transmitted from the first vehicle. The message comprises, for example, a reason such as, for example, the driver state and/or the faulty vehicle state, a driving strategy of the respective vehicle such as, for example, path planning for the steering and/or speed.

The detection of the emergency situation is alternatively or additionally carried out, for example, by detecting a predefined signal of the first vehicle. The predefined signal is generated, for example, by way of exterior lighting and/or a horn, and includes, for example, warning sounds and/or light signals, for example in a predefined sequence such as three short, three long, three short warning sounds and/or light signals.

According to a further aspect, the invention is distinguished by a computer program, wherein the computer program is designed to carry out the method for detecting autonomously operated vehicles or an advantageous configuration of the method for detecting autonomously operated vehicles, the method for distance measurement or an advantageous configuration of the method for distance measurement, the method for distance control or an advantageous configuration of the method for distance control, on a data processing device.

According to a further aspect, the invention is distinguished by a computer program product which comprises executable program code, wherein when the program code is executed by a data processing device, it executes the method for detecting autonomously operated vehicles or an advantageous configuration of the method for detecting autonomously operated vehicles; the method for distance measurement or an advantageous configuration of the method for distance measurement; and/or the method for distance control or an advantageous configuration of the method for distance control.

The computer program product comprises, in particular, a medium which can be read by the data processing device and on which the program code is stored.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 6 is a flowchart for distance control.

Elements with identical design or function are characterized with the same reference symbols in all the figures.

DETAILED DESCRIPTION OF THE DRAWINGS

Figure 1:
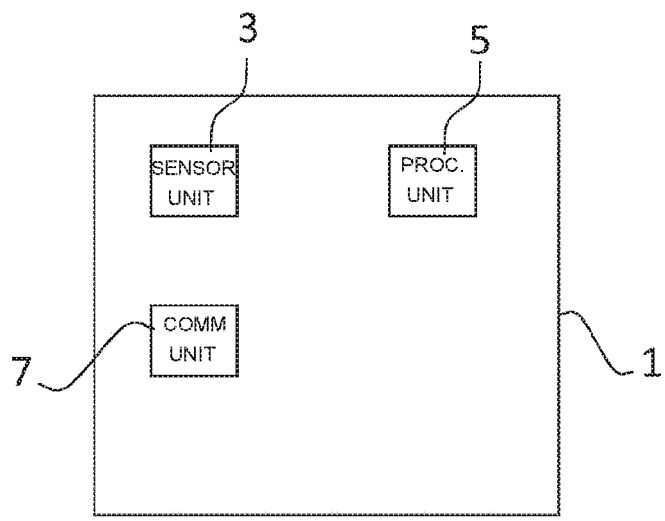
FIG. 1 is a schematic diagram of a device for detecting autonomously operated vehicles.

FIG. 1 shows a device 1 for detecting autonomously operated vehicles. The device 1 has, for example, a sensor unit 3. The sensor unit 3 is designed to generate a measurement signal, wherein a motion trajectory BT of a vehicle can be determined as a function of the measurement signal. The sensor unit 3 has for this, in particular, at least one camera, a radar sensor and/or a lidar sensor.

Alternatively or additionally to the sensor unit 3, the device 1 has, for example, a communication unit 7. The communication unit 7 is designed, for example, to transmit and to receive data.

The communication unit 7 is designed, in particular, to receive autonomy information item AI of a first vehicle 10 (FIG. 2), which information AI is representative of whether the first vehicle 10 is being operated autonomously or non-autonomously.

The device 1 has a processing unit 5. If the device 1 has the sensor unit 3, the processing unit 5 is, in particular, designed to determine the motion trajectory BT of the first vehicle 10 (FIG. 2) as a function of the measurement signal of the sensor unit 3.

The processing unit 5 is designed, for example, to determine, as a function of the determined motion trajectory BT, an autonomy characteristic value AKW which is representative of whether the first vehicle 10 has been detected as being operated autonomously or non-autonomously. Alternatively or additionally, the processing unit 5 is designed to determine the autonomy characteristic value AKW as a function of the autonomy information item AI.

Alternatively or additionally, the processing unit 5 is designed to determine, as a function of the determined motion trajectory BT, a first distance profile AV1 for a second vehicle 12 which is driving in front of the first vehicle 10, and to determine the autonomy characteristic value AKW as a function of the first distance profile AV1. The first distance profile AV1 is representative of a chronological profile of a distance D1 of the first vehicle 10 from the second vehicle 12.

The first vehicle 10 is alternatively or additionally located next to and/or in front of the second vehicle 12.

Alternatively or additionally, the processing unit 5 is designed to determine a lane-keeping profile SV of the first vehicle 10 as a function of the determined motion trajectory BT, and to determine the autonomy characteristic value AKW as a function of the lane-keeping profile SV.

Alternatively or additionally, the processing unit 5 is designed to determine a second distance profile AV2 of the first vehicle 10 with respect to the sensor unit 3 as a function of the determined motion trajectory BT and to determine the autonomy characteristic value AKW as a function of the second distance profile AV2. The second distance profile AV2 is representative of a chronological profile of a distance D2 of the first vehicle 10 from the sensor unit 3.

The processing unit 5 is therefore designed, in particular, to analyze the motion trajectory BT to determine whether regulator-typical or human-typical properties can be detected in the motion trajectory BT, in the first distance profile AV1, in the second distance profile AV2 and/or in the lane-keeping profile SV, in order to infer whether the first vehicle 10 is probably being operated autonomously or non-autonomously. For example, by means of the motion trajectory BT it is also possible to determine a reaction time by which it can be detected, under certain circumstances, whether the first vehicle 10 is probably being operated autonomously or non-autonomously, for example if another vehicle is intentionally braking in front of the first vehicle 10, for example since a distance measurement from the first vehicle 10 is to be carried out in the other vehicle.

The processing unit 5 is designed, for example, to determine the autonomy characteristic value AKW as a function of a detection of atypical values in the motion trajectory BT, in the first distance profile AV1, in the lane-keeping profile SV and/or in the second distance profile AV2.

Alternatively or additionally, the processing unit 5 is designed to determine the autonomy characteristic value AKW as a function of a frequency analysis of the motion trajectory BT, of the first distance profile AV1, of the second distance profile AV2 and/or of the lane-keeping profile SV.

The first vehicle 10 (FIGS. 2 and 3) has, in particular, a vehicle communication unit 15 which is designed to communicate with the communication unit 7 of the device 1.

The vehicle communication unit 15 is designed, in particular, to transmit an autonomy message which includes the autonomy information item AI.

The vehicle communication unit 15 is, for this purpose, designed, for example, to transmit the autonomy message periodically, for example by what is referred to as a Cooperative Awareness Message (CAM) according to the Standard ETSI TS 102 637-2 V1.2.1 (2011-03) and/or what is referred to as a Basic Safety Message (BSM) according to the Standard SAE J2735.

Alternatively or additionally, the vehicle communication unit 15 is designed to transmit the autonomy message on the vehicle side in response to a request, wherein the request has been transmitted to the vehicle communication unit 15 of the first vehicle 10 from outside the first vehicle 10. For this purpose, in particular, the communication unit 7 of the device 1 is designed to transmit the request to the vehicle communication unit 15.

The first vehicle 10 additionally has, for example, a test unit 25 which is designed to determine a plausibility of the autonomy information item AI as a function of at least one bus signal in the first vehicle 10. The vehicle communication unit 15 is in this case additionally designed, for example, to transmit a plausibility signal PS to the communication unit 7 of the device 1 if the determined plausibility is representative of the probable manipulation of the autonomy information item AI. The processing unit 5 of the device 1 is, in this case, designed, in particular, to determine the autonomy characteristic value AKW as a function of the plausibility signal PS in response to the plausibility signal PS.

Figure 2:
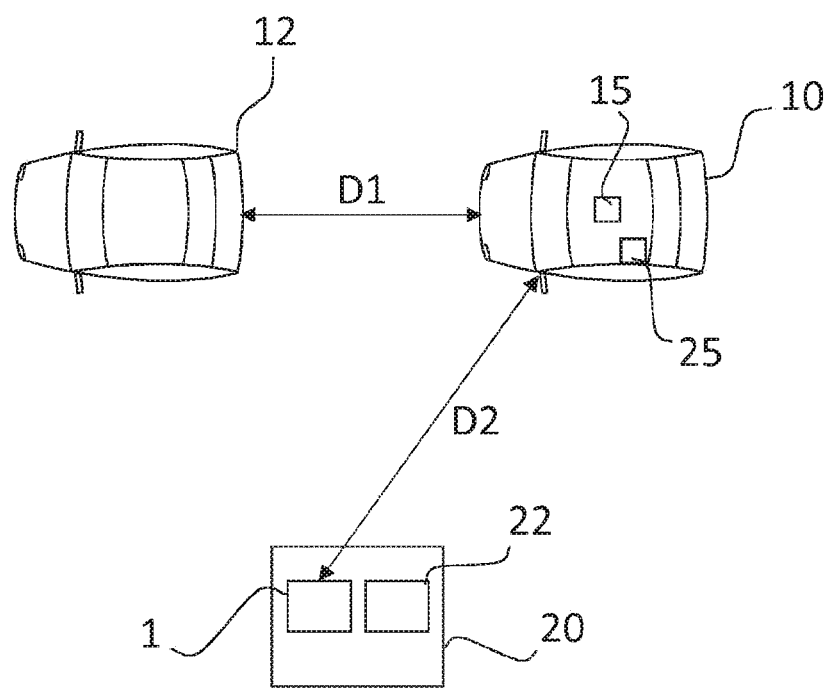
FIG. 2 is a schematic diagram of a system for distance measurement.

FIG. 2 shows an application example of the device 1 for detecting autonomously operated vehicles in a system 20 for distance measurement.

The system 20 has, in addition to the device 1, a distance-measuring unit 22 which is designed to determine the distance D1 of the first vehicle 10 from the second vehicle 12 which is driving in front of the first vehicle 10.

Alternatively or additionally, the system 20 has, for example, the vehicle communication unit 15 and/or the test unit 25.

If the device 1 for detecting autonomously operated vehicles is used in the system 20 for distance measurement, the processing unit 5 is, for example, additionally designed to determine a distance threshold value AS as a function of the autonomy characteristic value AKW, specifically in such a way that if the first vehicle 10 has been detected as being operated autonomously, the distance threshold value AS is lower than if the first vehicle 10 is detected as being operated non-autonomously.

Furthermore, the processing unit 5 is, for example, designed to determine whether the determined distance D1 is less than the determined distance threshold value AS and if the determined distance D1 is less than the determined distance threshold value AS, to store information I in this respect. The information I, which is stored in this respect includes, for example, the determined distance D1 and/or a difference between the determined distance D1 and the determined distance threshold value AS and/or whether the first vehicle 10 has been detected as being operated autonomously or non-autonomously. Alternatively or additionally, the information I includes, for example, a recorded image of the driver of the vehicle and/or a speed of the first vehicle 10 and/or a detected license plate of the first vehicle 10.

Figure 3:
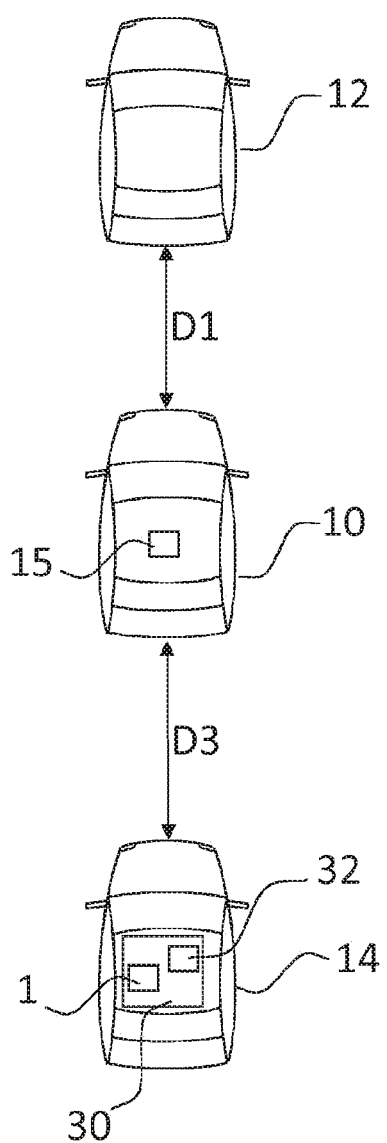
FIG. 3 is a schematic diagram of a system for distance control.

FIG. 3 shows the device 1 for detecting autonomously operated vehicles in a system 30 for distance control in a third vehicle 14 which is driving behind the first vehicle 10.

The system 30 has a distance control unit 32 in addition to the device 1 for detecting autonomously operated vehicles. The distance control unit 32 is designed, in particular, to set a distance D3 of the third vehicle 14 from the first vehicle 10 as a function of the autonomy characteristic value AKW.

Alternatively or additionally, the system 30 has, for example, the vehicle communication unit 15 and/or the test unit 25.

The processing unit 5 of the device 1 is in this case additionally designed, for example, to determine a manufacturer H and/or a model designation M of the first vehicle 10, for example by way of object recognition via a camera, in particular by way of the sensor unit 3.

The processing unit 5 is also designed, for example, to determine at least one parameter PAR for distance state control as a function of the determined manufacturer H and/or the model designation M. The distance control unit 32 is designed here to set the distance D3 of the third vehicle 14 from the first vehicle 10 as a function of the at least one parameter PAR. Alternatively or additionally, the processing unit 5 is designed to determine the at least one parameter PAR as a function of the determined motion trajectory BT.

The device 1 also has, in particular, at least one computing unit, one program and data memory and, for example, one or more communication interfaces.

The program and data memory and the computing unit can be embodied in one component and/or distributed between a plurality of components.

For example, the device 1 can also be distributed between one or more components. It is therefore possible, for example, for a part of the device 1, which part has, for example, the sensor unit 3, the communication unit 7 and/or the processing unit 5, to be embodied in a stationary fashion and/or in the third vehicle 14, and for another part, which has, for example, the communication unit 7 and/or the processing unit 5, to be embodied in a server such as, for example, in a backend.

Figure 4:
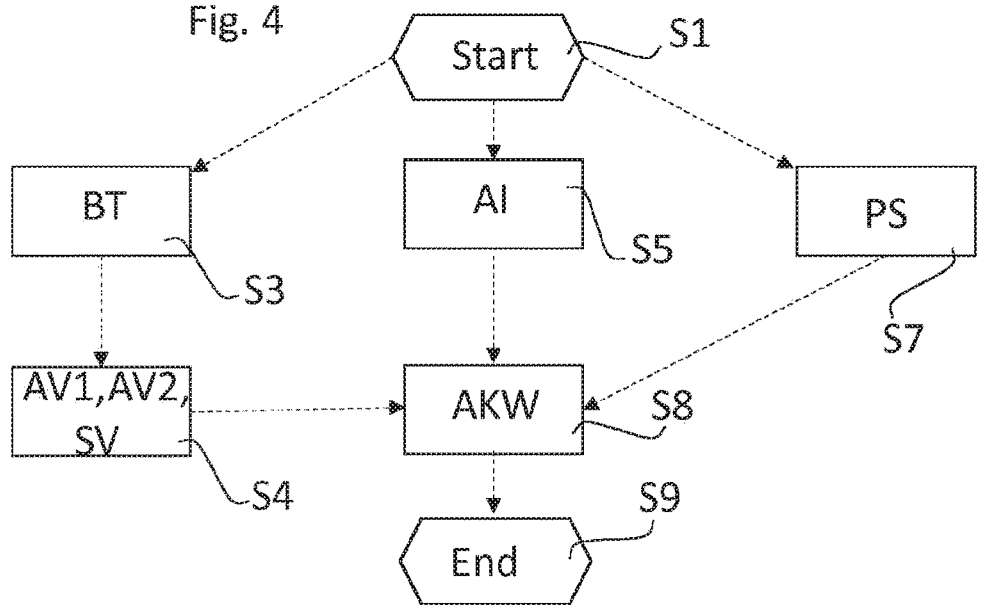
FIG. 4 is a flowchart for detecting autonomously operated vehicles.

FIG. 4 is a flowchart of a program for detecting autonomously operated vehicles. The program can be processed, in particular, by the device 1.

The program is started in a step S1 in which, if appropriate, variables can be initialized. The program is continued in a step S3. If the autonomy information item AI of the first vehicle 10 is received by the communication unit 7, the program is alternatively or additionally continued in a step S5. If the plausibility signal PS of the first vehicle 10 is received by the communication unit 7, the program is alternatively or additionally continued in a step S7.

In the step S3, the motion trajectory BT of the first vehicle 10 is determined. The motion trajectory BT is determined here, in particular, as a function of the measurement signal of the sensor unit 3.

In a subsequent optional step S4, the first distance profile AV1 for the second vehicle 12 and/or the second distance profile AV2 for the sensor unit 3 and/or the lane-keeping profile SV are/is determined as a function of the motion trajectory BT, for example.

In the step S5, the autonomy information item AI of the first vehicle 10 is made available. For this purpose, for example, the autonomy message is transmitted on the vehicle side by the vehicle communication unit 15, which message includes the autonomy information item AI. The autonomy message is, for example, transmitted periodically. Alternatively or additionally, the autonomy message is transmitted in response to a request which has been transmitted, for example, by the communication unit 7 to the vehicle communication unit 15. The request is signed, for example, by use of a certificate. Alternatively or additionally, the autonomy message is signed, for example, on the vehicle side by use of a certificate. The autonomy message is verified by the communication unit 7 and/or the processing unit 5 for example by way of a challenge-response method. The autonomy message includes the autonomy information item AI, for example in an encrypted form, and the encrypted autonomy information item AI is decrypted, for example, by the communication unit 7 and/or the processing unit 5.

In the step S7, the plausibility signal PS is made available. The plausibility signal PS is determined, for example, by the test unit 25 as a function of at least one bus signal in the first vehicle 10 and, if the determined plausibility is representative of a probable manipulation of the autonomy information item AI, said plausibility signal PS is transmitted by the vehicle communication unit 15.

In a step S8, the autonomy characteristic value AKW is determined. The autonomy characteristic value AKW is determined, for example, as a function of the determined motion trajectory BT, as a function of the autonomy information item AI and/or as a function of the plausibility signal PS.

Alternatively or additionally, the autonomy characteristic value AKW is determined as a function of a the first distance profile AV1, the second distance profile AV2 and/or the lane-keeping profile SV.

Alternatively or additionally, the autonomy characteristic value AKW is determined as a function of a detection of atypical values in the motion trajectory BT, in the first distance profile AV1, in the second distance profile AV2 and/or in the lane-keeping profile SV.

Alternatively or additionally, the autonomy characteristic value AKW is determined as a function of a frequency analysis of the motion trajectory BT, of the first distance profile AV1, of the second distance profile AV2 and/or of the lane-keeping profile SV.

Subsequently, the program is ended in a step S9 and can, under certain circumstances, be started again in the step S1.

If the program for detecting autonomously operated vehicles is executed in the system 20 for distance measurement, the program can alternatively or additionally be continued, as is explained below with reference to FIG. 5.

Figure 5:
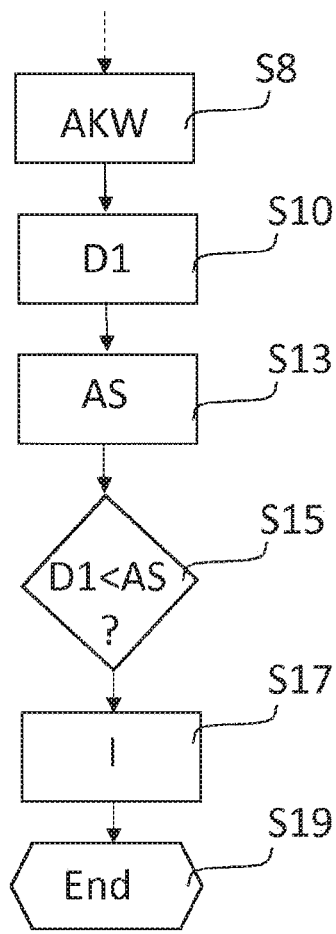
FIG. 5 is a flowchart for distance measurement.

FIG. 5 is a flowchart of a program for distance measurement, wherein the steps S1-S7 are executed in accordance with the flowchart of FIG. 4. After the step S5, the program is continued in a step S10 in which the distance D1 of the first vehicle 10 from the second vehicle 12 is determined, in particular by way of the sensor unit 3.

In a step S13, the distance threshold value AS is determined, specifically in such a way that if the first vehicle 10 has been detected as being operated autonomously, the distance threshold value AS is smaller than if the first vehicle 10 has been detected as being operated non-autonomously.

In a step S15, it is determined whether the determined distance D1 is less than the determined distance threshold value AS. If the determined distance D1 is less than the determined distance threshold value AS, the program is continued in a step S17.

In the step S17, the information I that determined distance D1 is less than the determined distance threshold value AS is stored.

In a step S19, the program is ended and can, under certain circumstances, be started again in the step S1.

If the program for detecting autonomously operated vehicles is executed in the system 30 for distance control, the program can alternatively or additionally be continued, as is explained below with reference to FIG. 6.

FIG. 6 is a flowchart of a program for distance control, wherein the steps S1-S7 are executed in accordance with a flowchart of FIG. 4. After the step S8, the program is continued in a step S23 or optionally in a step S20.

In the step S20, a manufacturer H and/or a model designation M of the first vehicle 10 is determined, in particular by way of the sensor unit 3.

In the step S21, a parameter PAR is determined for distance control, as a function of the determined manufacturer H, the model designation M and/or the motion trajectory BT.

In the step S23, the distance D3 of the third vehicle 14 to the first vehicle 10 is set as a function of the at least one determined parameter PAR and/or as a function of the autonomy characteristic value AKW.

The program is subsequently ended in the step S25.

By means of the explained procedure, it is easily possible to detect autonomously operated vehicles. This can be used, for example, for a distance measurement which differentiates between autonomously operated vehicles and non-autonomously operated vehicles. Furthermore, this can be used, for example, in a distance control process for a vehicle which is travelling behind the autonomously operated vehicle.

LIST OF REFERENCE SYMBOLS

1 Device
3 Sensor unit
5 Processing unit
7 Communication unit
10 First vehicle
12 Second vehicle
14 Third vehicle
15 Vehicle communication unit
20 System
22 Distance-measuring unit
25 Test unit
30 System
32 Distance control unit
D1 Distance (between first and second vehicles)
D2 Distance (between sensor unit and first vehicle)
D3 Distance (between first and third vehicles)
AI Autonomy information item
AKW Autonomy characteristic value
AS Distance threshold value
AV1 First distance profile
AV2 Second distance profile
BT Motion trajectory
H Manufacturer
I Information
M Model designation
PAR Parameter
PS Plausibility signal
SV Lane-keeping profile The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting autonomously operated vehicles, the method comprising the acts of:
    sensing a motion trajectory of a first vehicle via a sensor unit located outside the first vehicle;
    determining an autonomy characteristic value via a processor as a function of the motion trajectory of a single vehicle, wherein the single vehicle is the first vehicle, the autonomy characteristic value representative of whether the first vehicle is being operated autonomously or non-autonomously; and
    controlling a distance of a third vehicle from the first vehicle based on the autonomy characteristic value.

2. The method according to claim 1, wherein:
    a first distance profile for a second vehicle driving in front of the first vehicle is determined as a function of the determined motion trajectory, and
    the determined autonomy characteristic value is determined as a function of the first distance profile.

3. The method according to claim 2, wherein:
    a lane-keeping profile of the first vehicle is determined as a function of the determined motion trajectory, and
    the determined autonomy characteristic value is determined as a function of the lane-keeping profile.

4. The method according to claim 1, wherein:
    a lane-keeping profile of the first vehicle is determined as a function of the determined motion trajectory, and
    the determined autonomy characteristic value is determined as a function of the lane-keeping profile.

5. The method according to claim 1, wherein:
    a second distance profile of the first vehicle with respect to the sensor unit which is arranged outside the first vehicle and is designed to generate a measurement signal is determined as a function of the determined motion trajectory, wherein the motion trajectory is determined as a function of the measurement signal, and
    the determined autonomy characteristic value is determined as a function of the second distance profile.

6. The method according to claim 1, wherein the determined autonomy characteristic value is determined as a function of a detection of atypical values in the motion trajectory.

7. The method according to claim 1, wherein the determined autonomy characteristic value is determined as a function of a frequency analysis of the motion trajectory.

8. The method as claimed in claim 1, wherein subsequent to reception of an autonomy information item from outside the first vehicle, which autonomy information item is representative of whether the first vehicle is being operated autonomously or non-autonomously, the autonomy characteristic value is determined as a function of the autonomy information item.

9. A device for detecting autonomously operating vehicles, the device comprising:
    a processing unit and associated memory storing program code that, when executed by the processing unit, carries out the method of:

causing a sensor unit located outside a first vehicle to sense a motion trajectory of the first vehicle;
determining an autonomy characteristic value as a function of the motion trajectory of a single vehicle, wherein the single vehicle is the first vehicle, the autonomy characteristic value representative of whether the first vehicle is being operated autonomously or non-autonomously; and
controlling a distance of a third vehicle from the first vehicle based on the autonomy characteristic value.

10. The device according to claim 9, wherein the processing unit executes the program code to:
determine a first distance profile for a second vehicle driving in front of the first vehicle as a function of the determined motion trajectory, and
determine the determined autonomy characteristic value as a function of the first distance profile.

11. The device according to claim 9, wherein the processing unit executes the program code to:
determine a lane-keeping profile of the first vehicle as a function of the determined motion trajectory, and
determine the determined autonomy characteristic value as a function of the lane-keeping profile.

12. The device according to claim 11, wherein the processing unit executes the program code to:
determine a second distance profile of the first vehicle with respect to the sensor unit which is arranged outside the first vehicle and is designed to generate a measurement signal as a function of the determined motion trajectory, wherein the motion trajectory is determined as a function of the measurement signal, and
determine the determined autonomy characteristic value as a function of the second distance profile, and
determine the determined autonomy characteristic value as a function of the lane-keeping profile.

13. A method for reporting unsafe autonomous vehicle behavior, the method comprising the acts of:
sensing a motion trajectory of a first vehicle via a sensor unit located outside the first vehicle;
determining an autonomy characteristic value via a processor as a function of the motion trajectory of a single vehicle, wherein the single vehicle is the first vehicle, the autonomy characteristic value representative of whether the first vehicle is being operated autonomously or non-autonomously;
determining a first distance to the first vehicle from a second vehicle driving in front of the first vehicle;
determining a distance threshold value as a function of the autonomy characteristic value such that, if the first vehicle is detected as being operated autonomously, the distance threshold value is lower than if the first vehicle is detected as being operated non-autonomously;
determining whether the determined first distance is less than the determined distance threshold value;
if the determined first distance is less than the determined distance threshold value, storing a corresponding information item; and
transmitting the corresponding information item to one or more of: a police authority and a manufacturer of the first vehicle.

14. A method for distance control in a third vehicle driving behind a first vehicle, the method comprising the acts of:
sensing a motion trajectory of the first vehicle via a sensor unit located outside the first vehicle;
determining an autonomy characteristic value via a processor as a function of the motion trajectory of a single vehicle, wherein the single vehicle is the first vehicle, the autonomy characteristic value representative of whether the first vehicle is being operated autonomously or non-autonomously; and
controlling a distance from the third vehicle to the first vehicle as a function of the autonomy characteristic value.

15. The method according to claim 14, further comprising the acts of:
determining a manufacturer and/or a model designation of the first vehicle;
determining at least one distance control parameter as a function of the determined manufacturer and/or the determined model designation;
setting the distance from the third vehicle to the first vehicle as a function of the at least one determined distance control parameter.

16. The method according to claim 15, wherein a distance control parameter is determined as a function of the determined motion trajectory, the method further comprising the act of: setting the distance from the third vehicle to the first vehicle as a function of the determined distance control parameter.

17. The method according to claim 14, wherein a distance control parameter is determined as a function of the determined motion trajectory, the method further comprising the act of: setting the distance from the third vehicle to the first vehicle as a function of the determined distance control parameter.

18. A computer program product comprising a computer readable medium having stored thereon executable program code which, when executed via a processing unit, carries out the method of:
causing a sensor unit located outside a first vehicle to sense a motion trajectory of the first vehicle;
determining an autonomy characteristic value as a function of the motion trajectory of a single vehicle, wherein the single vehicle is the first vehicle, the autonomy characteristic value representative of whether the first vehicle is being operated autonomously or non-autonomously; and
controlling a distance of a third vehicle from the first vehicle based on the autonomy characteristic value.

19. The computer program product according to claim 18, wherein when the program code is executed by the processing unit, it further carries out the method of:
determining a distance of the first vehicle from a second vehicle driving in front of the first vehicle;
determining a distance threshold value as a function of the autonomy characteristic value such that, if the first vehicle is detected as being operated autonomously, the distance threshold value is lower than if the first vehicle is detected as being operated non-autonomously;
determining whether the determined distance is less than the determined distance threshold value; and
if the determined distance is less than the determined distance threshold value, storing an information item to that affect.

20. The computer program product according to claim 18, wherein when the program code is executed by the processing unit, it further carries out the method of: determining the determined autonomy characteristic value as a function of a lane-keeping profile.

* * * * *